(12) United States Patent
Oleksinski

(10) Patent No.: US 6,675,363 B1
(45) Date of Patent: Jan. 6, 2004

(54) GRAPHICAL USER INTERFACE TO INTEGRATE THIRD PARTY TOOLS IN POWER INTEGRITY ANALYSIS

(75) Inventor: Nick Oleksinski, Northville, MI (US)

(73) Assignee: LSI Logic Corporation, Milpitas, CA (US)

( * ) Notice: Subject to any disclaimer, the term of this patent is extended or adjusted under 35 U.S.C. 154(b) by 120 days.

(21) Appl. No.: 10/014,746

(22) Filed: Oct. 24, 2001

(51) Int. Cl.$^7$ .............................................. G06F 17/50
(52) U.S. Cl. .................. 716/4; 716/5; 716/6; 345/661; 345/700; 345/762
(58) Field of Search ..................... 716/4–6, 1; 345/594, 345/661, 676, 700, 762

(56) References Cited

U.S. PATENT DOCUMENTS

| | | | |
|---|---|---|---|
| 5,933,356 A | * | 8/1999 | Rostoker et al. ............. 364/489 |
| 6,099,580 A | * | 8/2000 | Boyle et al. .................... 716/7 |
| 6,327,698 B1 | * | 12/2001 | Kolluru .......................... 717/1 |
| 6,345,379 B1 | * | 2/2002 | Khouja et al. .................. 716/4 |
| 6,353,844 B1 | * | 3/2002 | Bitar et al. .................. 709/102 |
| 6,438,729 B1 | * | 8/2002 | Ho .................................. 716/1 |

OTHER PUBLICATIONS

A forty–two (42) page brochure from Philips entitled *Design Integrator*, available at least as early as Oct. 22, 2001.
A thirty–one (31) page brochure from Protel entitled *Protel 99 SE*, available at least as early as Oct. 23, 2001.

* cited by examiner

Primary Examiner—Vuthe Siek
(74) Attorney, Agent, or Firm—Trexler, Bushnell, Giangiorgi, Blackstone & Marr, Ltd.

(57) ABSTRACT

A power integrity analysis integration tool for analyzing the power integrity of a semiconductor layout previously designed using a separate design tool. The power integrity analysis integration tool includes a graphic user interface that is configured to extract layout data from the design tool and perform a transistor-level analysis of the power integrity of the semiconductor layout. A method of designing a semiconductor layout and performing a transistor-level analysis of the power integrity of the semiconductor layout includes, first, using a design tool to design the semiconductor layout, and then using the power integrity analysis integration tool to extract layout data from the design tool and perform a transistor-level analysis of the power integrity of the semiconductor layout.

40 Claims, 3 Drawing Sheets

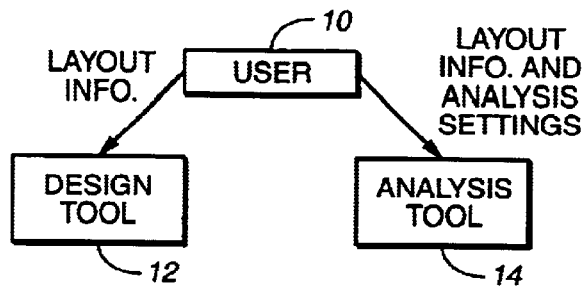
FIG._1
*(PRIOR ART)*
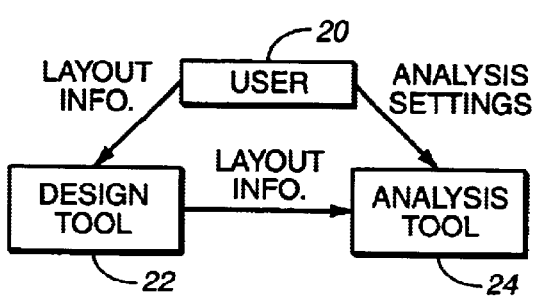
FIG._2
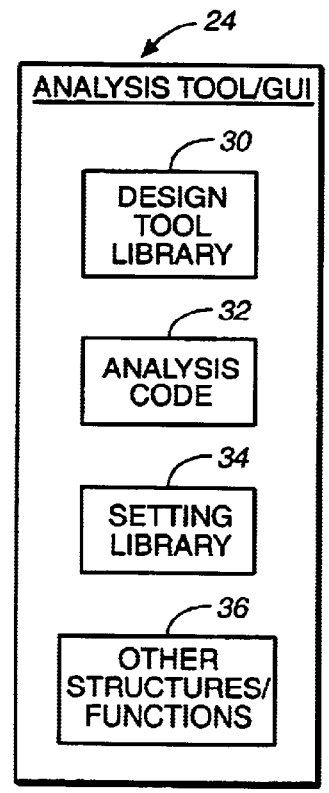
FIG._3

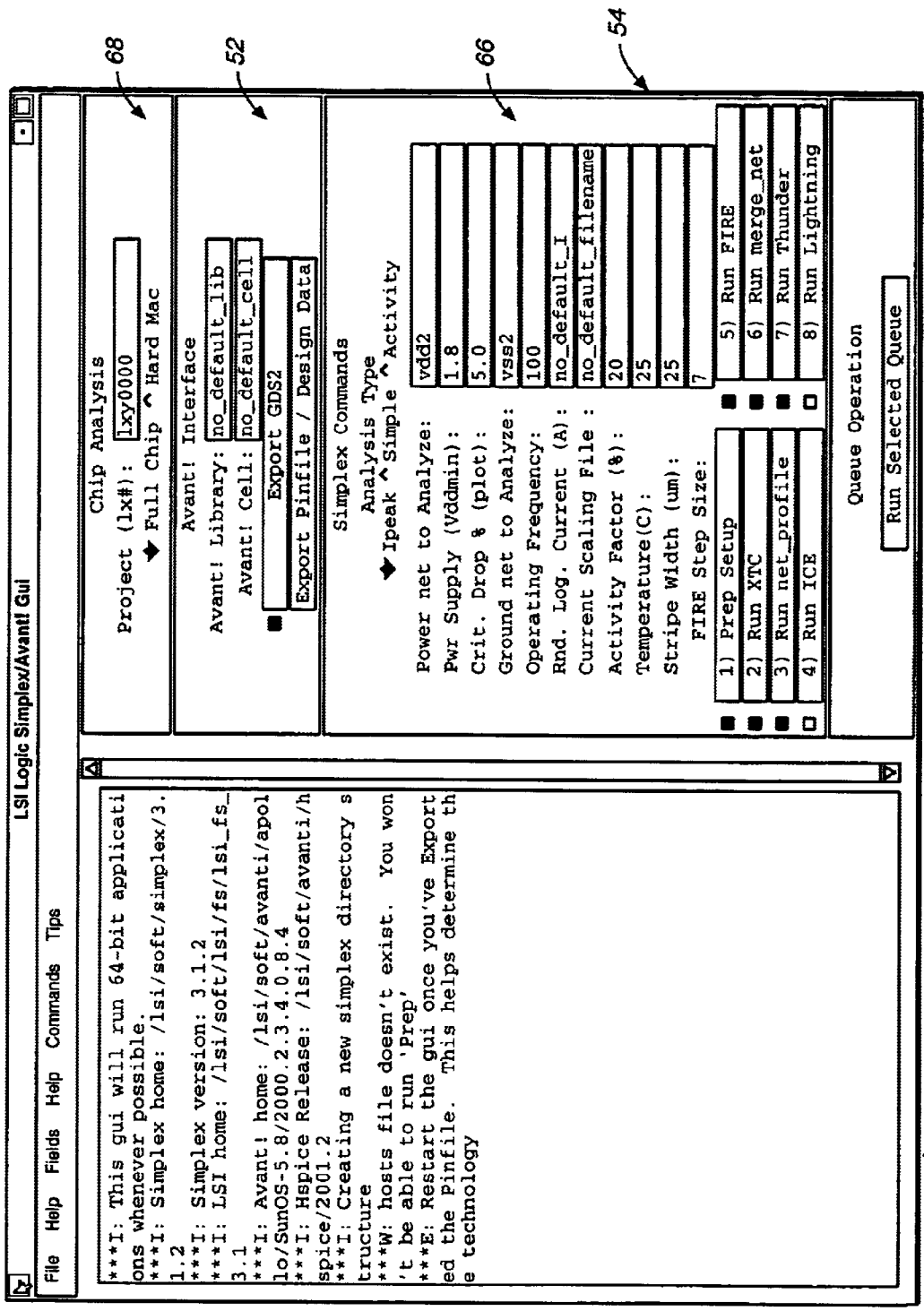
FIG._4

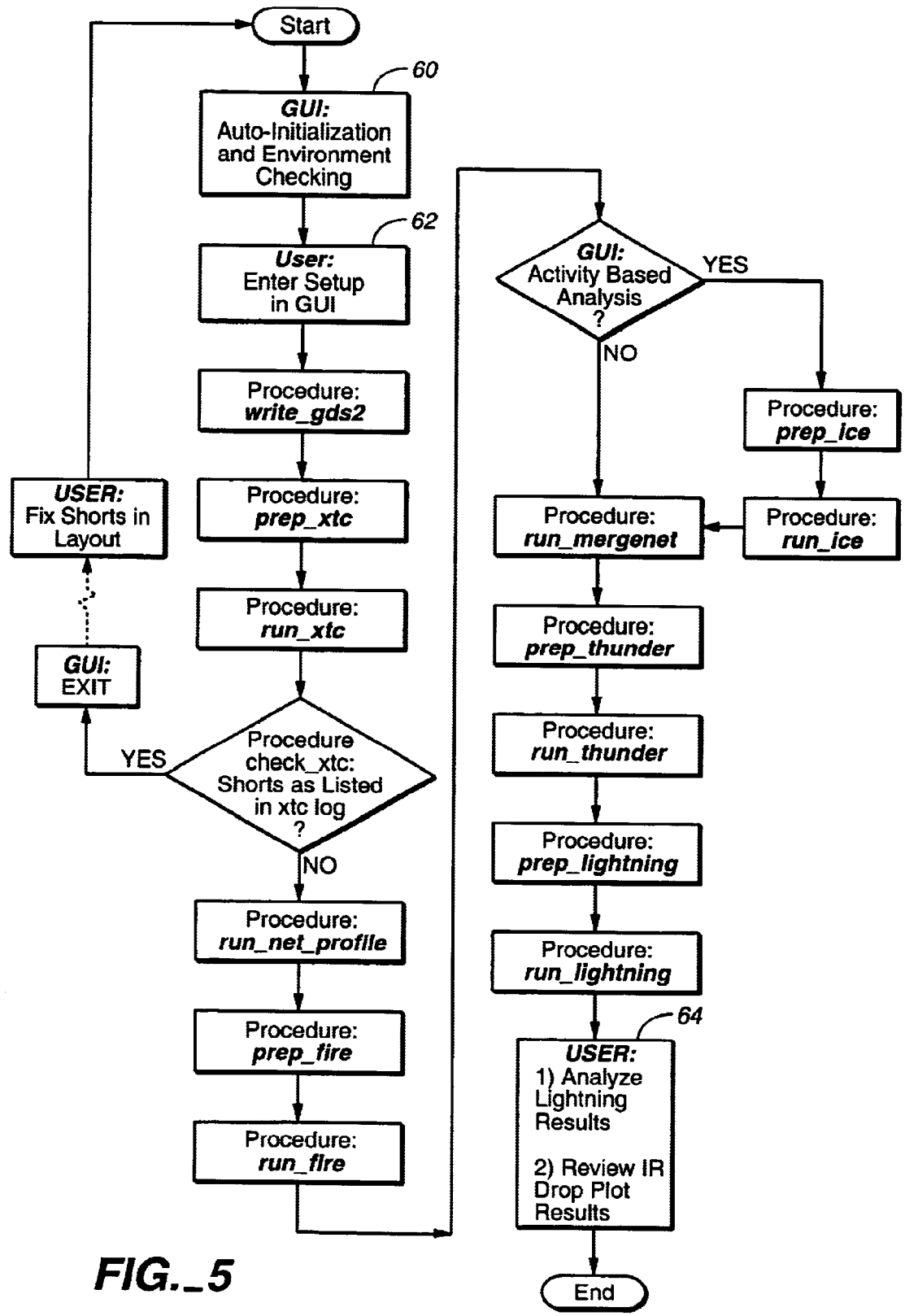
FIG._5

GRAPHICAL USER INTERFACE TO INTEGRATE THIRD PARTY TOOLS IN POWER INTEGRITY ANALYSIS

REFERENCE TO COMPACT DISCS (CD-R'S) FILED WITH THE APPLICATION

Duplicate compact discs (CD-R's) have been filed with the present application as a computer program listing appendix. Each compact disc contains the following file: "code" (105 kB, created Jun. 19, 2003). The material on the compact discs is incorporated herein by reference as a computer program listing appendix.

FIELD OF THE INVENTION

The present invention generally relates to power integrity analysis in semiconductor layout, and more specifically relates to a graphic user interface which is configured to integrate third party tools in power integrity analysis.

BACKGROUND OF THE INVENTION

As shown in FIG. 1, presently, when an engineer wants to design a semiconductor layout and then perform a transistor-level power integrity analysis of the layout, the engineer (user 10 in FIG. 1) first uses a design tool 12 to design the layout. Such design tools include Avant! and FlexStream. After the engineer has designed the layout, he or she inputs as much information as possible about the layout into a power integrity analysis integration tool 14, and uses the analysis tool to perform a transistor-level power integrity analysis of the layout. Depending on the results of the analysis, the engineer 10 may revise the layout using the design tool 12 and re-analyze the revised layout. The process may be repeated several times.

The present method of using one tool (a design tool) to design a semiconductor layout and manually entering information about the layout into another tool (an analysis tool) in order to perform a transistor-level power integrity analysis of the layout requires that data be entered twice. Hence, the method is tedious and is prone to error. Additionally, the method is inefficient due to the lack of batch queuing. The inputs are generally so fragmented into different setup files, etc. that it is extremely difficult to complete the flow in one attempt without experiencing setup file problems or errors. Furthermore, the method requires, as a result of having to make manual entries into the power integrity analysis integration tool, that the engineer effectively be an expert in running such power integrity tools.

OBJECTS AND SUMMARY OF THE INVENTION

A general object of an embodiment of the present invention is to provide a graphic user interface which is configured to integrate third party tools in power integrity analysis.

Another object of an embodiment of the present invention is to provide a graphic user interface which is configured to extract information about a semiconductor layout from a design tool which has been previously used to design the semiconductor layout.

Still another object of an embodiment of the present invention is to provide an integrated power integrity analysis flow suite which is efficient and relatively easy to use.

Still yet another object of an embodiment of the present invention is to provide a power integrity analysis method which is not prone to error.

Yet still another object of an embodiment of the present invention is to provide a power integrity analysis integration tool which is configured such that it can used by someone who is not an expert in running power integrity tools.

Briefly, and in accordance with at least one of the foregoing objects, an embodiment of the present invention provides a power integrity analysis integration tool for analyzing the power integrity of a semiconductor layout previously designed using a separate design tool. The power integrity analysis integration tool provides a graphic user interface that is configured to extract layout data from the design tool and perform a transistor-level analysis of the power integrity of the semiconductor layout.

Preferably, the results of the analysis is displayed, and the power integrity analysis integration tool determines whether a correct environment was set up by a user using the design tool, logs all operations and collect all logs in a common place, checks for errors at each step of the analysis, performs batch queuing of all commands, saves all settings and retrieves the settings each time the power integrity analysis integration tool is started. Additionally, preferably the power integrity analysis integration tool is configured to interact with a plurality of different design tools, and is configured to determine which optimized binaries to use for each different design tool. Preferably, the power integrity analysis integration tool is configured such that a user selects which design tool is to be interacted with by the power integrity analysis integration tool. Preferably, the power integrity analysis integration tool is configured to prompt the user for a location of the data to be extracted, and is configured such that a plurality of procedures are listed to be selected by the user, and the power integrity analysis integration tool performs the selected procedures during the analysis. A method of designing a semiconductor layout and performing a transistor-level analysis of the power integrity of the semiconductor layout includes, first, using a design tool to design the semiconductor layout, and then using the power integrity analysis integration tool to extract layout data from the design tool and perform a transistor-level analysis of the power integrity of the semiconductor layout.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a simple block diagram of a prior art process, wherein a user provides semiconductor layout data to both a design tool and an analysis tool;

FIG. 2 is a simple block diagram of a process which is in accordance with an embodiment of the present invention, wherein a user provides semiconductor layout data to a design tool, and an analysis tool extracts the semiconductor layout data from the design tool in order to perform a power integrity analysis of the semiconductor layout;

Ad FIG. 3 is a simple block diagram of the power integrity analysis integration tool which is shown in FIG. 2;

FIG. 4 is a screen shot illustrating a graphic user interface of the power integrity analysis integration tool shown in FIGS. 2 and 3; and FIG. 5 is a flow chart of the power integrity analysis integration tool shown in FIGS. 2 and 3.

DESCRIPTION

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

An embodiment of the present invention provides a power integrity analysis integration tool, a graphic user interface that is configured to extract layout data from a design tool and perform a transistor-level analysis of the power integrity of a semiconductor layout which was previously designed using the design tool. Such a power integrity analysis integration tool enables the method shown in FIG. 2 wherein, unlike that which is shown in FIG. 1, a user 20 provides a design tool 22 with semiconductor layout information to design the layout. Then, the user 20 defines some settings for the analysis tool 24, and directs the analysis tool 24 to perform the analysis. The analysis tool 24 then extracts the layout information from the design tool 22, performs the analysis, and provides a report of the analysis to the user 20. This is in contrast to that which is shown in FIG. 1, wherein the user 10 must input layout information to both the design tool 12 and the analysis tool 14, thus increasing the chances for error.

The analysis tool 24 of the present invention is efficient and is relatively easy to use. Additionally, because the analysis tool 24 is configured to extract the data from the design tool 22, one need not be an expert in running power integrity tools 24 in order to perform a power integrity analysis.

As shown in FIG. 3, the power integrity analysis integration tool 24 includes several structures including a design tool library 30, analysis code 32 and a setting library 34 as well as other structures/functions 36. All of the structures and functions of the power integrity analysis integration tool 24 are apparent from reviewing the source code listed above. Notwithstanding this fact, some of the structures/functions will be described in detail below.

The power integrity analysis integration tool 24 may be configured to extract layout information from a specific design tool such as Avant! or FlexStream. Alternatively, as shown in FIG. 3, the power integrity analysis integration tool may include a design tool library 30 which provides that the power integrity analysis integration tool 24 can extract layout information from several different types of design tools. The analysis tool 24 may be configured to query the user as to which type of design tool the analysis tool 24 is to extract data, as well as query the user for the location (i.e. on a hard drive) of the data (see item 50 of FIG. 4). Preferably, the power integrity analysis integration tool 24 is configured to determine which optimized binaries to use for each different design tool.

As shown in FIG. 3, the power integrity analysis integration tool 24 includes analysis code 32 which provides that the analysis tool 24 can analyze the data extracted from the design tool 22. Preferably, the analysis tool 24 is configured to run a transistor-level analysis on the extracted data.

Preferably, the analysis tool 24 is configured to run several different types of procedures, which may be called: write_gds2, prep_XTC, run_XTC, run_net_profile, prep_fire, run_fire, run_mergenet, prep_ice, run_ice, prep_thunder, run_thunder, prep_lightning and run_lightning. As shown in FIG. 4, preferably the analysis tool 24 is configured to query the user as to which of the several procedures to run (see area 52 of FIG. 4), such as Setup, XTC, net_profile, ICE, FIRE, merge_net, Thunder and Lightning.

Each of the procedures mentioned above will now be briefly discussed in the case where Simplex is used, and the application is written to extract data from Avant! Jupiter (FIG. 4 is directed to such an application—see item 50 of FIG. 4). Write_gds2 runs the design tool software application in batch mode to export a layout database in a format (gds2) readable by the third party IR drop analysis tool (such as Simplex). Prep_xtc writes a command script for the Simplex XTC tool, and run_xtc runs XTC using the command script generated by prep_xtc. Run_net_profile runs net_profile on the translated database (XTC output). Prep_fire writes a command script for the Simplex FIRE (resistance extraction) tool, and run_fire runs FIRE using the command script generated by prep_fire. Run_mergenet runs the Simplex MERGENET tool on the output of FIRE. Prep_ice writes a command script for the Simplex ICE (capacitance extraction) tool, and run_ice runs Ice using the command script generated by prep_ice. Prep_thunder writes a command script for the Simplex THUNDER (tap current calculator) tool, and run_thunder runs THUNDER using the command script generated by prep_thunder. Prep_lightning writes a command script for the Simplex LIGHTNING tool, and run_lightning runs LIGHTNING using the command script generated by prep_lightning.

A detailed flowchart is illustrated in FIG. 5 and is self-explanatory. With regard to box 60, this section of the flow defines options, including layout tool and power analysis tool setups. With regard to box 62, auto-initialization will not allow an analysis flow to proceed unless a proper environment is present. Optimal tool versions for the environment are also chosen based on the Operating System present. With regard to box 64, the analysis tool is configured such that the user reviews IR drop results after running the analysis tool which plots the results (LIGHTNING);

The display shown in FIG. 5 has been briefly discussed above. As shown, the analysis tool may also be configured to query the user for several settings relevant to the analysis to be performed (see area 66 of FIG. 4). Additionally, the user may be able to define the project (see area 68 of FIG. 4), and a space may be provided for reporting the results of the analysis (see area 70 of FIG. 4). Still other features of the graphic user interface are apparent from viewing FIG. 5.

With regard to settings, as shown in FIG. 4, preferably the analysis tool includes a settings library 34. More specifically, preferably the analysis tool 24 is configured to save all the settings provided by the user and retrieve the settings each time the power integrity analysis integration tool 24 is started. Additionally, preferably the analysis tool 24 is configured to determine whether a correct environment was set up by a user using the design tool 22, log all operations and collect all logs in a common place (i.e. in a library), check for errors at each step of the analysis, and perform batch queuing of all commands.

By providing a graphic user interface that is configured to extract layout data from a design tool and perform a transistor-level analysis of the power integrity of a semiconductor layout which was previously designed using the design tool, it is much easier to run power integrity analysis of a semiconductor layout. Additionally, there is less chance for error. Still further, such a graphic user interface provides that one need not be an expert in running power integrity tools in order to perform a power integrity analysis.

While an embodiment of the present invention is shown and described, it is envisioned that those skilled in the art may devise various modifications of the present invention without departing from the spirit and scope of the appended claims.

What is claimed is:

1. A power integrity analysis integration tool for analyzing the power integrity of a semiconductor layout previously designed using a separate design tool, said power integrity analysis integration tool comprising a graphic user interface configured to query a user as to which type of design tool the power integrity analysis tool is to extract data, extract layout data from the design tool and perform a transistor-level analysis of the power integrity of the semiconductor layout; wherein the power integrity analysis integration tool is configured to interact with a plurality of different design tools; wherein the power integrity analysis integration tool is configured to determine which optimized binaries to use for each different design tool.

2. A power integrity analysis integration tool as defined in claim 1, wherein the power integrity analysis integration tool is configured such that a user selects, using the graphic user interface, which design tool is to be interacted with by the power integrity analysis integration tool.

3. A power integrity analysis integration tool as defined in claim 1, wherein the power integrity analysis integration tool is configured such that the graphic user interface prompts the user for a location of the data to be extracted by the power integrity analysis integration tool.

4. A power integrity analysis integration tool as defined in claim 1, wherein the power integrity analysis integration tool is configured such that the graphic user interface lists a plurality of procedures to be selected by a user and performed by the power integrity analysis integration tool.

5. A power integrity analysis integration tool as defined in claim 1, wherein the power integrity analysis integration tool is configured to display the results of the analysis using the graphic user interface.

6. A power integrity analysis integration tool as defined in claim 1, wherein the power integrity analysis integration tool is configured to determine whether a correct environment was set up by a user using the design tool.

7. A power integrity analysis integration tool as defined in claim 1, wherein the power integrity analysis integration tool is configured to log all operations and collect all logs in a common place.

8. A power integrity analysis integration tool as defined in claim 1, wherein the power integrity analysis integration tool is configured to check for errors at each step of the analysis.

9. A power integrity analysis integration tool as defined in claim 1, wherein the power integrity analysis integration tool is configured to perform batch queuing of all commands.

10. A power integrity analysis integration tool as defined in claim 1, wherein the power integrity analysis integration tool is configured to save all settings and retrieve the settings each time the power integrity analysis integration tool is started.

11. A method of analyzing power integrity of a semiconductor layout previously designed using a separate design tool, said method comprising: having a power integrity analysis integration tool query a user as to which type of design tool the power integrity analysis tool is to extract data extract layout data from the design tool and perform a transistor-level analysis of the power integrity of the semiconductor layout; further comprising having the power integrity analysis integration tool interact with a plurality of different design tools; further comprising having the power integrity analysis integration tool determine which optimized binaries to use for each different design tool.

12. A method as defined in defined in claim 11, further comprising selecting, using a graphic user interface, which design tool is to be interacted with by the power integrity analysis integration tool.

13. A method as defined in claim 11, further comprising defining a location of the data to be extracted by the power integrity analysis integration tool.

14. A method as defined in claim 11, further comprising using a graphic user interface to select which procedures are to be performed by the power integrity analysis integration tool.

15. A method as defined in claim 11, further comprising having the power integrity analysis integration tool display results of the analysis.

16. A method as defined in claim 11, further comprising having the power integrity analysis integration tool determine whether a correct environment was set up by a user using the design tool.

17. A method as defined in claim 11, further comprising having the power integrity analysis integration tool log all operations and collect all logs in a common place.

18. A method as defined in claim 11, further comprising having the power integrity analysis integration tool check for errors at each step of the analysis.

19. A method as defined in claim 11, further comprising having the power integrity analysis integration tool perform batch queuing of all commands.

20. A method as defined in claim 11, further comprising having the power integrity analysis integration tool save all settings and retrieve the settings each time the power integrity analysis integration tool is started.

21. A power integrity analysis integration tool for analyzing the power integrity of a semiconductor layout previously designed using a separate design tool, said power integrity analysis integration tool comprising a graphic user interface configured to extract layout data from the design tool and perform a transistor-level analysis of the power integrity of the semiconductor layout, wherein the power integrity analysis integration tool is configured to interact with a plurality of different design tools and is configured to determine which optimized binaries to use for each different design tool.

22. A power integrity analysis integration tool as defined in claim 21, wherein the power integrity analysis integration tool is configured to display the results of the analysis using the graphic user interface.

23. A power integrity analysis integration tool as defined in claim 21, wherein the power integrity analysis integration tool is configured to determine whether a correct environment was set up by a user using the design tool.

24. A power integrity analysis integration tool as defined in claim 21, wherein the power integrity analysis integration tool is configured to log all operations and collect all logs in a common place.

25. A power integrity analysis integration tool as defined in claim 21, wherein the power integrity analysis integration tool is configured to check for errors at each step of the analysis.

26. A power integrity analysis integration tool as defined in claim 21, wherein the power integrity analysis integration tool is configured lo perform batch queuing of all commands.

27. A power integrity analysis integration tool as defined in claim 21, wherein the power integrity analysis integration tool is configured to save all settings and retrieve settings each time the power integrity analysis integration tool is started.

28. A power integrity analysis integration tool as defined in claim 21, wherein the power integrity analysis integration tool is configured such that a user selects, using the graphic user interface, which design tool is to be interacted with by the power integrity analysis integration tool.

29. A power integrity analysis integration tool as defined in claim 21, wherein the power integrity analysis integration tool is configured such that the graphic user interface prompts the user for a location of the data to be extracted by the power integrity analysis integration tool.

30. A power integrity analysis integration tool as defined in claim 21, wherein the power integrity analysis integration tool is configured such that the graphic user interface lists a plurality of procedures to be selected by a user and performed by the power integrity analysis integration tool.

31. A method of analyzing power integrity of a semiconductor layout previously designed using a separate design tool, said method comprising: having a power integrity analysis integration tool extract layout data from the design tool and perform a transistor-level analysis of the power integrity of the semiconductor layout; having the power integrity analysis integration tool interact with a plurality of different design tools; and having the power integrity analysis integration tool determine which optimized binaries to use for each different design tool.

32. A method as defined in claim 31, further comprising having the power integrity analysis integration tool display results of the analysis.

33. A method as defined in claim 31, further comprising having the power integrity analysis integration tool determine whether a correct environment was set up by a user using the design tool.

34. A method as defined in claim 31, further comprising having the power integrity analysis integration tool log all operations and collect all logs in a common place.

35. A method as defined in claim 31, further comprising having the power integrity analysis integration tool check for errors at each step of the analysis.

36. A method as defined in claim 31, further comprising having the power integrity analysis integration tool perform batch queuing of all commands.

37. A method as defined in claim 31, further comprising having the power integrity analysis integration tool save all settings and retrieve the settings each time the power integrity analysis integration tool is started.

38. A method as defined in claim 31, further comprising selecting, using a graphic user interface, which design tool is to be interacted with by the power integrity analysis integration tool.

39. A method as defined in claim 31, further comprising defining a location of the data to be extracted by the power integrity analysis integration tool.

40. A method as defined in claim 31, further comprising using a graphic user interface to select which procedures are to be performed by the power integrity analysis integration tool.

* * * * *